United States Patent
Thead et al.

(10) Patent No.: US 8,079,176 B1
(45) Date of Patent: Dec. 20, 2011

(54) COLLAPSIBLE ENCLOSURE

(76) Inventors: David Thead, Sandy Springs, GA (US);
John Evans, Sandy Springs, GA (US)

( * ) Notice: Subject to any disclaimer, the term of this patent is extended or adjusted under 35 U.S.C. 154(b) by 0 days.

(21) Appl. No.: 12/925,959

(22) Filed: Nov. 3, 2010

(51) Int. Cl.
*A01G 13/02* (2006.01)

(52) U.S. Cl. .......................... 47/29.6; 47/29.7

(58) Field of Classification Search ............ 47/29.6, 47/29.7, 20.1, 29.1, 29.2, 29.3, 29.4, 29.5, 47/30, 31, 31.1, 32.3, 45, 17, 69; D3/5; D11/145; 211/197; 428/12; 135/98, 124, 125, 126, 135/128, 143, 135, 99, 115, 118, 15.1, 16, 135/25.1, 33.2
See application file for complete search history.

(56) References Cited

U.S. PATENT DOCUMENTS

| | | | | |
|---|---|---|---|---|
| 2,864,389 A * | 12/1958 | Smith et al. | ...... | 135/98 |
| 3,374,798 A * | 3/1968 | Samuelson | ...... | 135/33.7 |
| 3,874,397 A * | 4/1975 | Oberhaus | ...... | 135/98 |
| 3,889,698 A * | 6/1975 | Roessl | ...... | 135/94 |
| 4,194,319 A * | 3/1980 | Crawford | ...... | 47/21.1 |
| 4,304,068 A * | 12/1981 | Beder | ...... | 47/17 |
| 4,327,520 A * | 5/1982 | Saxby et al. | ...... | 47/29.1 |
| 6,230,728 B1* | 5/2001 | Reese | ...... | 135/98 |
| 6,357,174 B1* | 3/2002 | Hernick | ...... | 47/45 |
| 6,776,177 B2* | 8/2004 | Wu | ...... | 135/98 |
| 6,810,618 B1* | 11/2004 | Hauser | ...... | 47/23.2 |
| 7,497,048 B2* | 3/2009 | Bakowski | ...... | 47/31 |
| 2006/0185708 A1* | 8/2006 | Sylvestre et al. | ...... | 135/135 |

* cited by examiner

*Primary Examiner* — T. Nguyen

(57) ABSTRACT

A collapsible enclosure includes a mount having a central shaft and a shell carried by the central shaft. The shell includes a first plurality of support arms carrying a cover and a second plurality of support arms pivotally connected with the first plurality of support arms for articulating the first plurality of support arms from a first generally linear position to a second generally bowed position for presenting the cover into a generally hemispherical configuration. Additionally, the first and second plurality of support arms is carried by the central shaft in a manner enabling the shell to traverse the central shaft when the cover is in the generally hemispherical configuration.

8 Claims, 6 Drawing Sheets

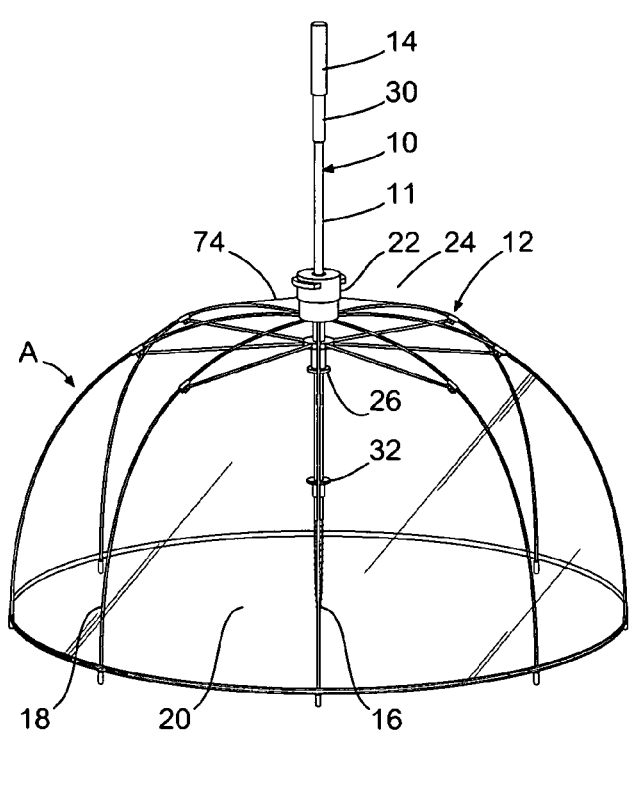
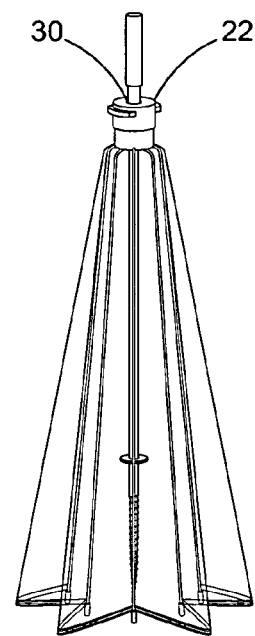
FIG. 2
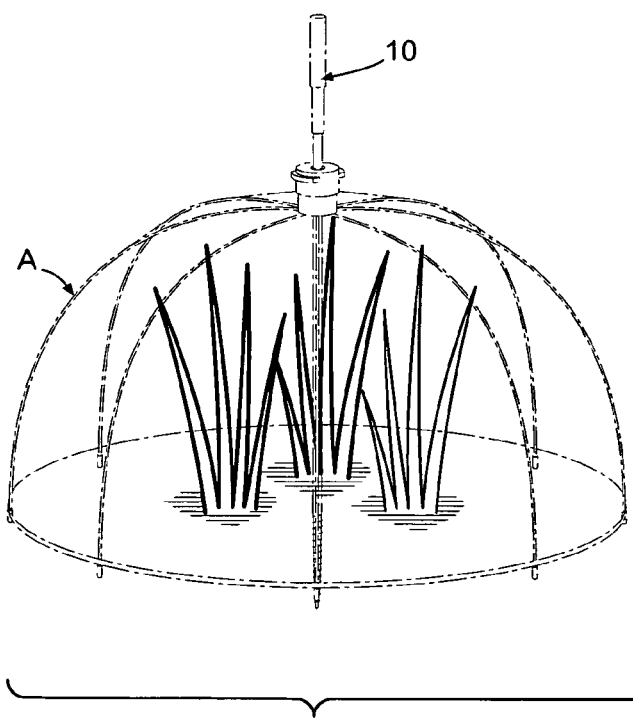
FIG. 1

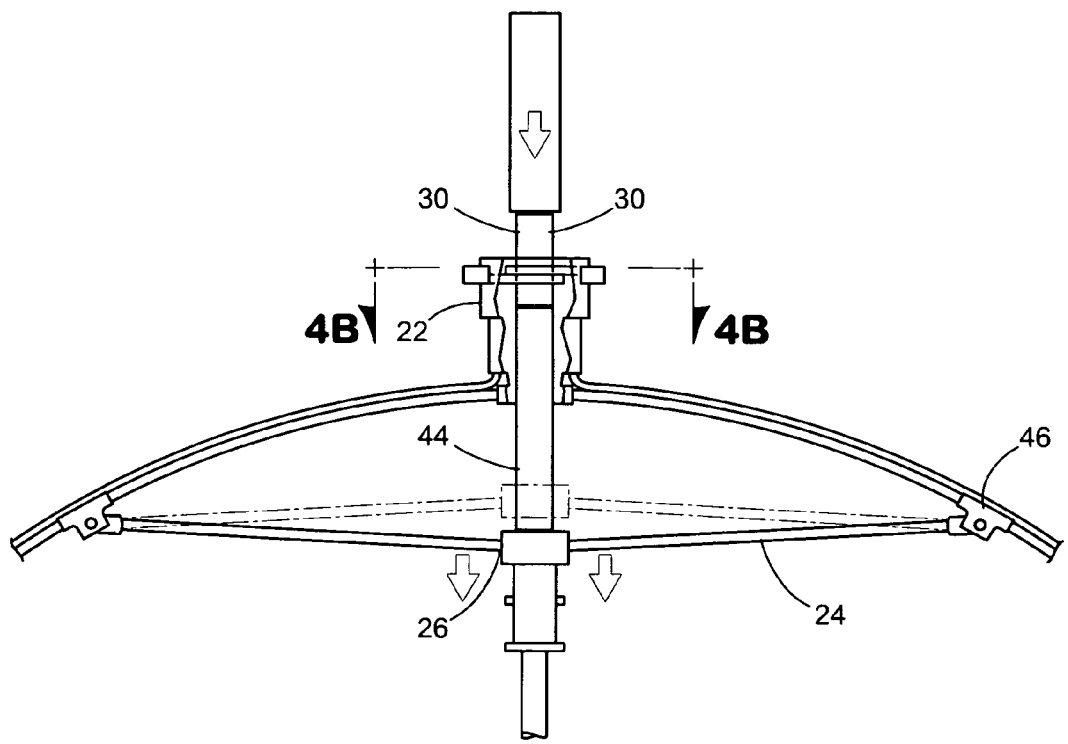
FIG. 3D
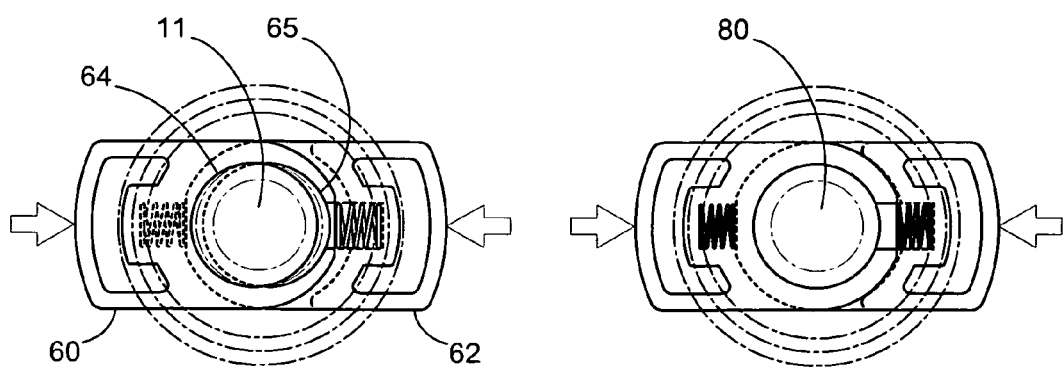
FIG. 4A  FIG. 4B

COLLAPSIBLE ENCLOSURE

BACKGROUND OF THE INVENTION

The invention relates generally to a collapsible cover and more particularly to a collapsible plant protector which enables a protective shield to traverse a central shaft for mounting the plant protector securely with the ground.

Plant protectors for enclosing plants and protecting them from the elements including insects are well known. Such protection is provided when inclement weather is present and also when animal or insect infestation may arise which would result in damage to various plants. Multiple configurations of such devices have been devised to enclose either a single plant or a group of plants in a terrarium type setting. U.S. Pat. No. 7,947,048 identifies one type of configuration which provides for a plurality of frame members to be utilized with a flexible cover in an expanded and collapsed position for storage. The flexible cover is intended to be separate from the underlying frame components and separate pegs are provided for securing the device to the ground. U.S. Pat. No. 4,304,068 discloses another previously designed collapsible terrarium. In this configuration the support structure and cover materials are integrated such that a single unit is provided. This terrarium utilizes an apron for contacting the ground. While both designs are suitable for their intended purpose, a device which is unitary and may be secured to the ground at different heights would be beneficial.

Accordingly, it is an object of the present invention to provide for a plant protector which is of a unitary design and which may be utilized in a fully expanded position defining a protective cover while also being collapsible for storage and transportation;

Furthermore, it is an object to provide for a plant protector which utilizes a flexible cover which may traverse a central mount enabling the flexible cover to be positioned independently of the central mount being anchored within the ground for securing the plant protector.

SUMMARY OF THE INVENTION

The above objectives are accomplished according to the invention by providing a collapsible enclosure which includes a mount having a central shaft. A shell is carried by the central shaft. The shell includes a first plurality of support arms carrying a cover and a second plurality of support arms pivotally connected with the first plurality of support arms for articulating the first plurality of support arms from a first generally linear position to a second generally bowed position for presenting the cover into a generally hemispherical configuration. Additionally, the first and second plurality of support arms are carried by the central shaft in a manner enabling the shell to traverse the central shaft when the cover is in the generally hemispherical configuration.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 illustrates the enclosure of the present invention in an expanded position for deployment over a plurality of plants with the cover secured;

FIG. 2 illustrates the enclosure of the present invention, in a collapsed and stowable position;

FIG. 3D illustrates the spoke hub of the enclosure of the present invention being displaced for collapsing the shell;

FIG. 4A illustrates the release assembly of the enclosure of the present invention in a state which prevents the shell from being collapsed;

FIG. 4B illustrates the release assembly of the enclosure of the present invention and as shown in FIG. 3D wherein the release assembly is in a state which enables the shell to collapse.

DESCRIPTION OF A PREFERRED EMBODIMENT

Figure 3A:
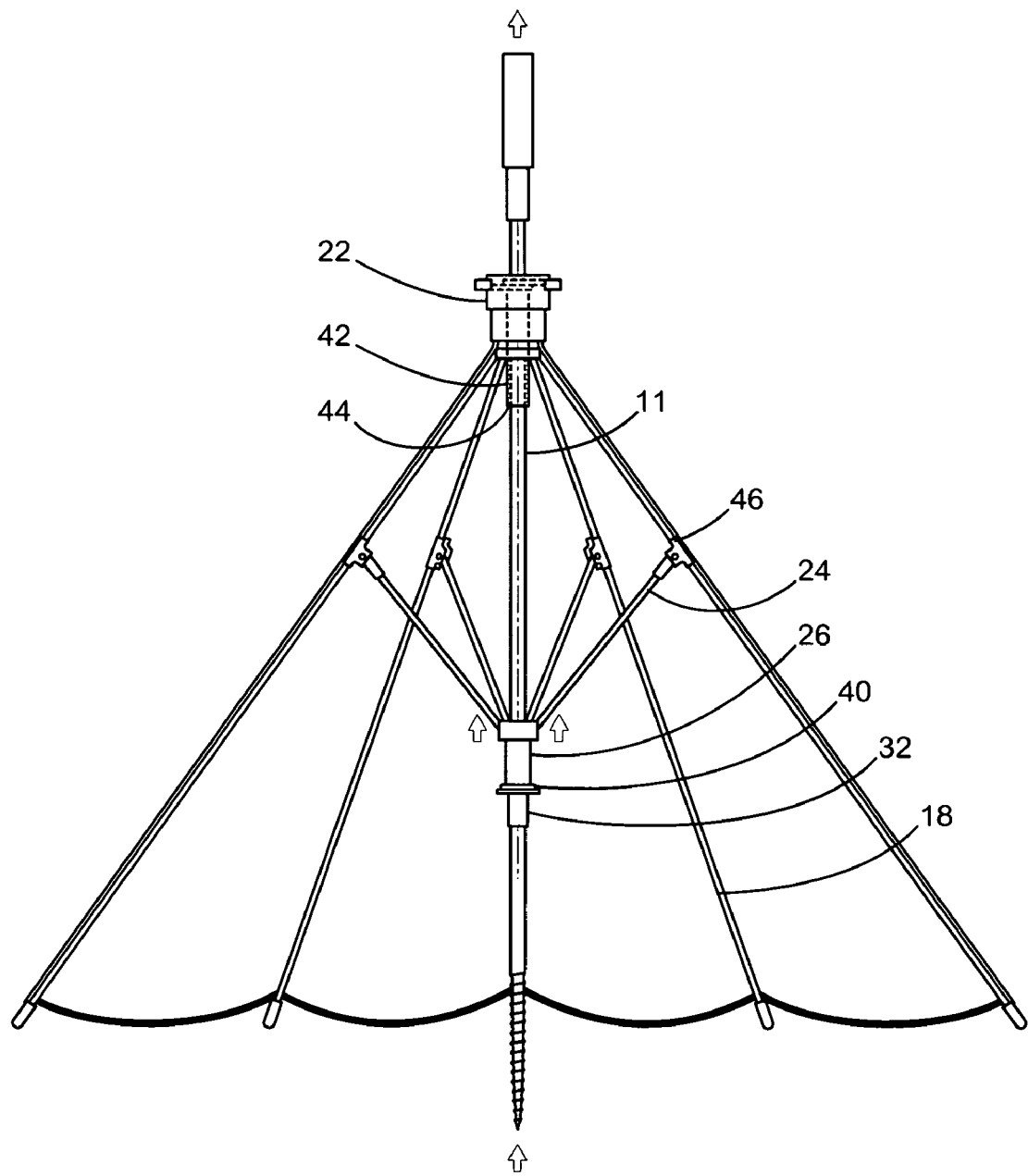
FIG. 3A is a perspective view of the enclosure shell according to the present invention partially deployed with a bushing engaging a spoke hub.

Referring now in more detail to the drawings, a preferred embodiment of the invention will now be described in more detail.

As shown in FIG. 1, enclosure A includes a mount 10 having a central shaft 11 and a shell 12. In the preferred embodiment, shell 12 is mounted in a manner which enables shell 12 to move vertically relative to mount 10. In this manner, mount 10 may be manipulated and secured into the ground independent from the positioning of shell 12.

Mount 10 includes a handle 14 disposed on one end of the mount and a securing tip 16 disposed on the opposite end. Preferably securing tip 16 is of an augered configuration. Additionally, as will be described in more detail with respect to FIGS. 3A-3D, mount 10 also carries a lower stop 30 and an upper stop 32.

Shell 12 includes a plurality of support arms 18 which carry a flexible cover 20. Cover support arms 18 are pliable and may flex from a linear position for storage as shown in FIG. 2 to a bowed configuration which projects flexible cover 20 outwards for encapsulating various plants as shown in FIG. 1. Preferably flexible cover 20 is transparent enabling sunlight to reach the encapsulated plants. Cover support arms 18 have a base end which are pivotally carried by release assembly 22 and a distal end which terminate approximately near the rim of flexible cover 20.

Furthermore, as shown in FIG. 1, a second plurality of support arms, or spokes, 24 are utilized for articulating cover support arms 18 from the linear position to the bowed configuration for projecting the flexible cover 20 outwards. The second plurality of support arms 24 are pivotally mounted to spoke hub 26 on a first end and also pivotally mounted with cover support arms 18 at their second end. Accordingly, as shown in FIG. 1, release assembly 22, spoke hub 26, cover support arms 18, and the second plurality of support arms 24 form a single operational structure. In the preferred embodiment, flexible cover 20 is also integrated within the structure for providing resistance to the cover support arms when the second plurality of support arms articulate the cover support arms enabling the cover support arms bow while also providing tension to the cover support arms for urging them to revert back to their original linear position for storage when the articulating force from the second plurality of support arms is removed from the cover support arms.

As shown in FIG. 2, collapsible enclosure A is in a collapsed position for storage. In this position, the release assembly 22 is actuated as will be discussed with respect to FIGS. 4A and 4B enabling the release assembly 22 to pass over lower stop 30 which enables the cover support arm 18 to be relaxed into a linear position and hence enables the collapsible enclosure to be collapsed for storage. The operation of the collapsible enclosure will be discussed with respect to FIGS. 3A-3D.

As shown in FIG. 3A, the collapsible enclosure is in transition from the stowed position illustrated in FIG. 2 to a deployed position shown in FIG. 1. For this transition, the cover unit is manipulated towards the distal end of mount 10. Both release assembly 22 and spoke hub 26 have central openings which allow the release assembly 22 and spoke hub 26 to slide along central shaft 11 towards the augered end of mount 10 having a screw configuration. As the cover assembly slides along central shaft 11, spoke hub 26 which preferably includes a flanged lower spoke hub end 40 engages upper stop 32. This engagement limits the lower movement of spoke hub 26 and the respective second plurality of support arms 24. While the lower movement of spoke hub 26 is inhibited, release assembly 22 is enabled to continue sliding downward. As the release assembly 22 moves downward lowering cover support arms 18, the respective second plurality support arms which are pivotally mounted with the cover support arms 18 at pivot mount 46 pivot to a generally horizontal position thereby exerting a bracing influence onto the cover support arms 18 thereby bowing the support arm 18 outward.

Figure 3B:
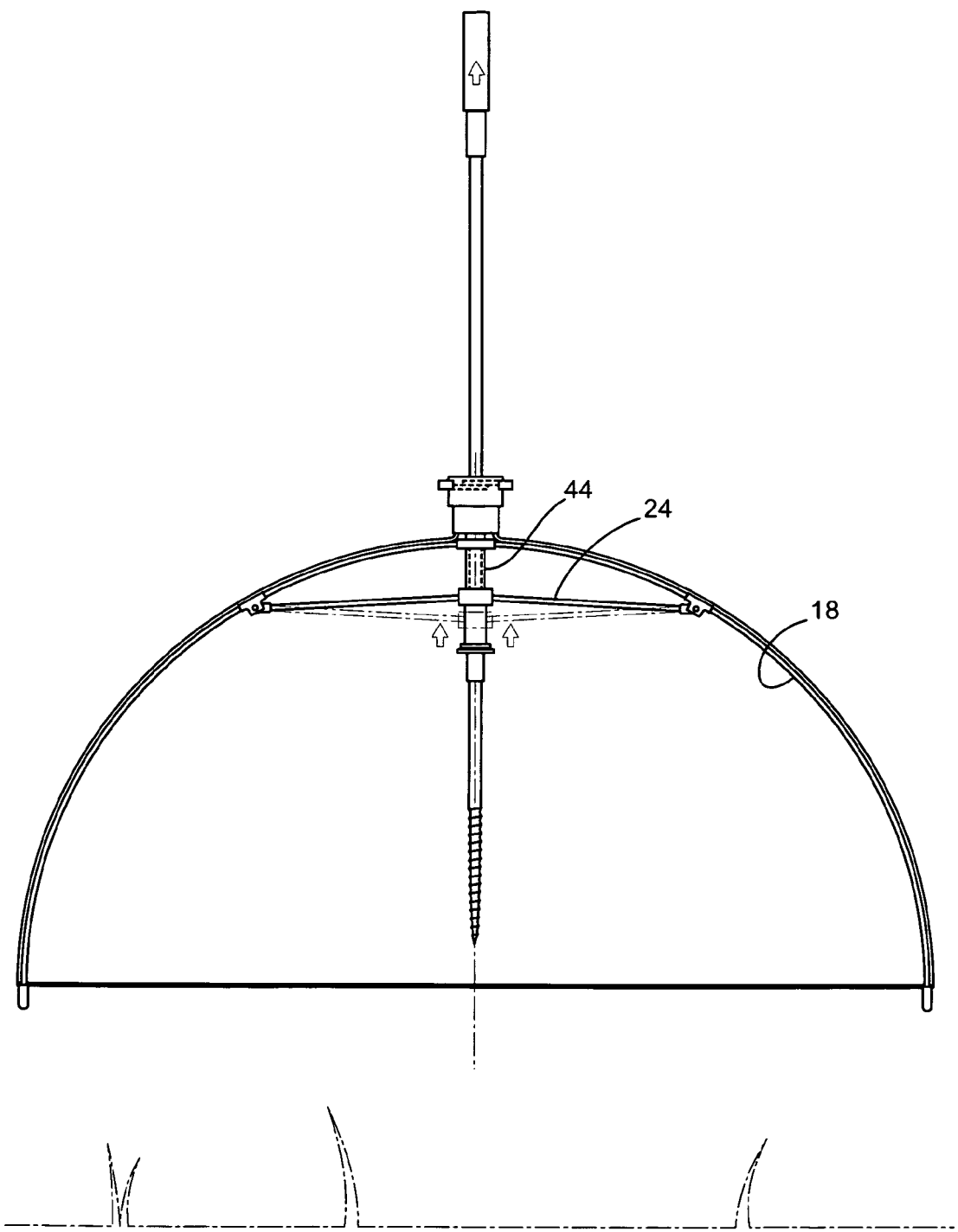
FIG. 3B is a perspective view of the enclosure shell according to the present invention fully deployed with the spoke hub in an over center and locked position maintaining the enclosure shell in the deployed position.

As shown in FIG. 3B, the cover has been fully deployed with the circumferential bowing of the cover support arms 18. This bowing is achieved by reducing the offset spacing between the release assembly 22 and spoke hub 26. With the lower movement of spoke hub 26 limited, release assembly 22 slides down central shaft 11 towards spoke hub 26. An intermediary spacer 44, intermediary between release assembly 22 and spoke hub 26, is carried downward along central shaft 11 by the downward movement of release assembly 22. The release assembly 22 is allowed to travel downward until intermediary spacer engages the upper flanged surface of spoke hub 26. The configuration of the shell is such that when the downward travel of release assembly 22 is stopped, the downward movement of the cover support arms manipulates the pivoting of the secondary support arms such that the secondary support arms pass over center into a locked position. This locked position places tension on the expanded cover maintaining the shell as a single deployed entity. When the cover is fully deployed it provides an enclosure for encapsulating an object such as a plant. The locked support arms maintain the tension throughout the shell. In this manner, the single shell unit may travel along the length of the central shaft 11 while being fully deployed in a covering position.

Figure 3C:
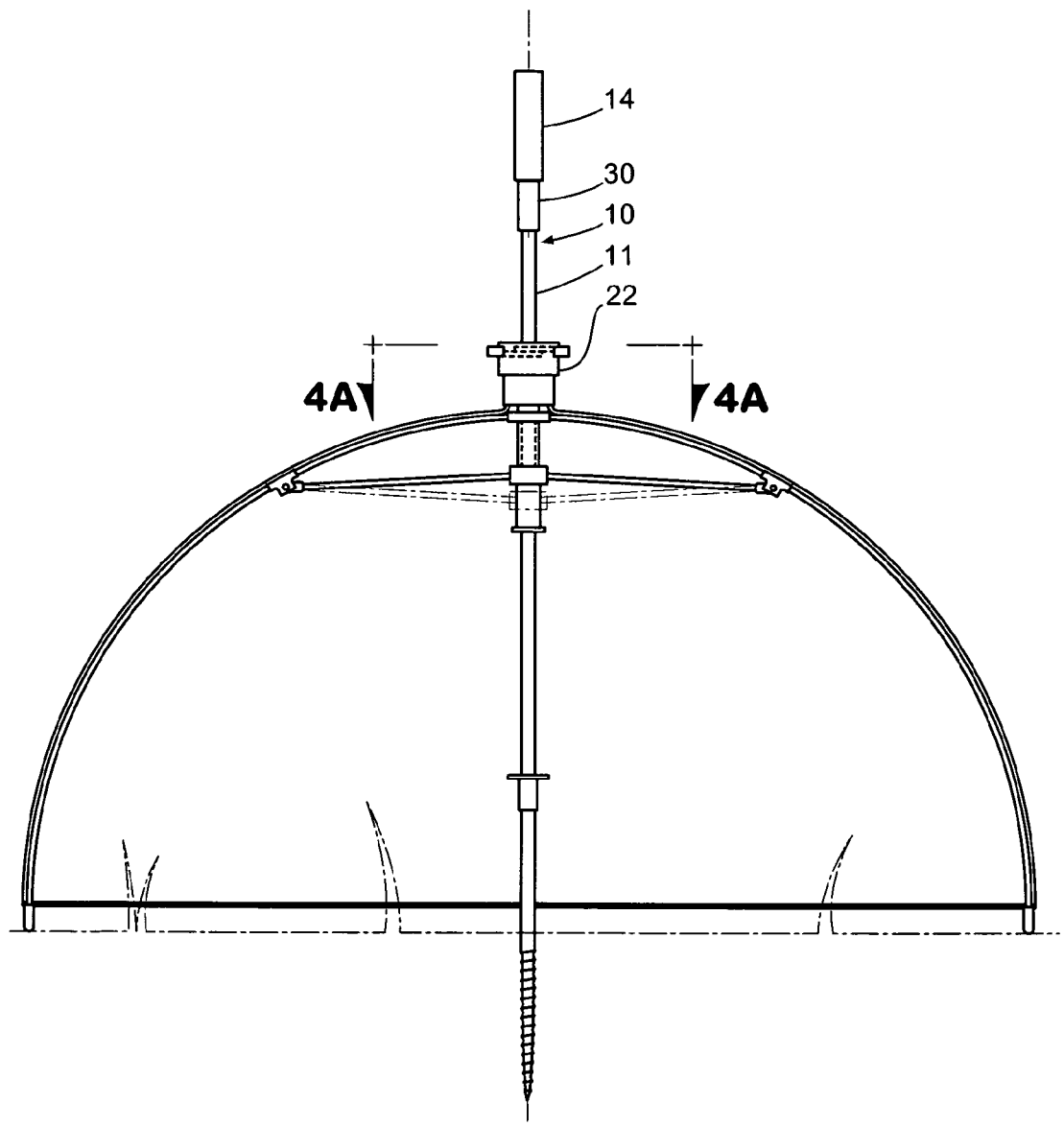
FIG. 3C is a perspective view of the enclosure shell according to the present invention being secured with the ground.

The traveling of the unitary shell unit with respect to the mount 10 is illustrated in FIG. 3C. As shown in FIG. 3C, the distal end of the mount, which is preferably augered, is secured into the ground. The single cover unit travels upward along central shaft 11 in a fully deployed configuration enabling the augered end to enter into the ground to a desired depth. By having the release assembly 22 and spoke hub 26 being independent items which can independently travel along the central shaft 11 while being interconnected via the spoke arms and support arms provides for a unique construction which enables the cover to achieve its desired goal of enabling the augered end to be secured while allowing the deployed shell to be positioned over the desired objects such as plants.

The movement of the unitary shell unit towards the handle is limited by the interaction of the release assembly 22 and lower stop 30. Lower stop 30 prohibits the release assembly 22 from passing further down shaft 11 of mount 10 unless manual manipulation of the release assembly 22 permits the passing.

Figure 5:
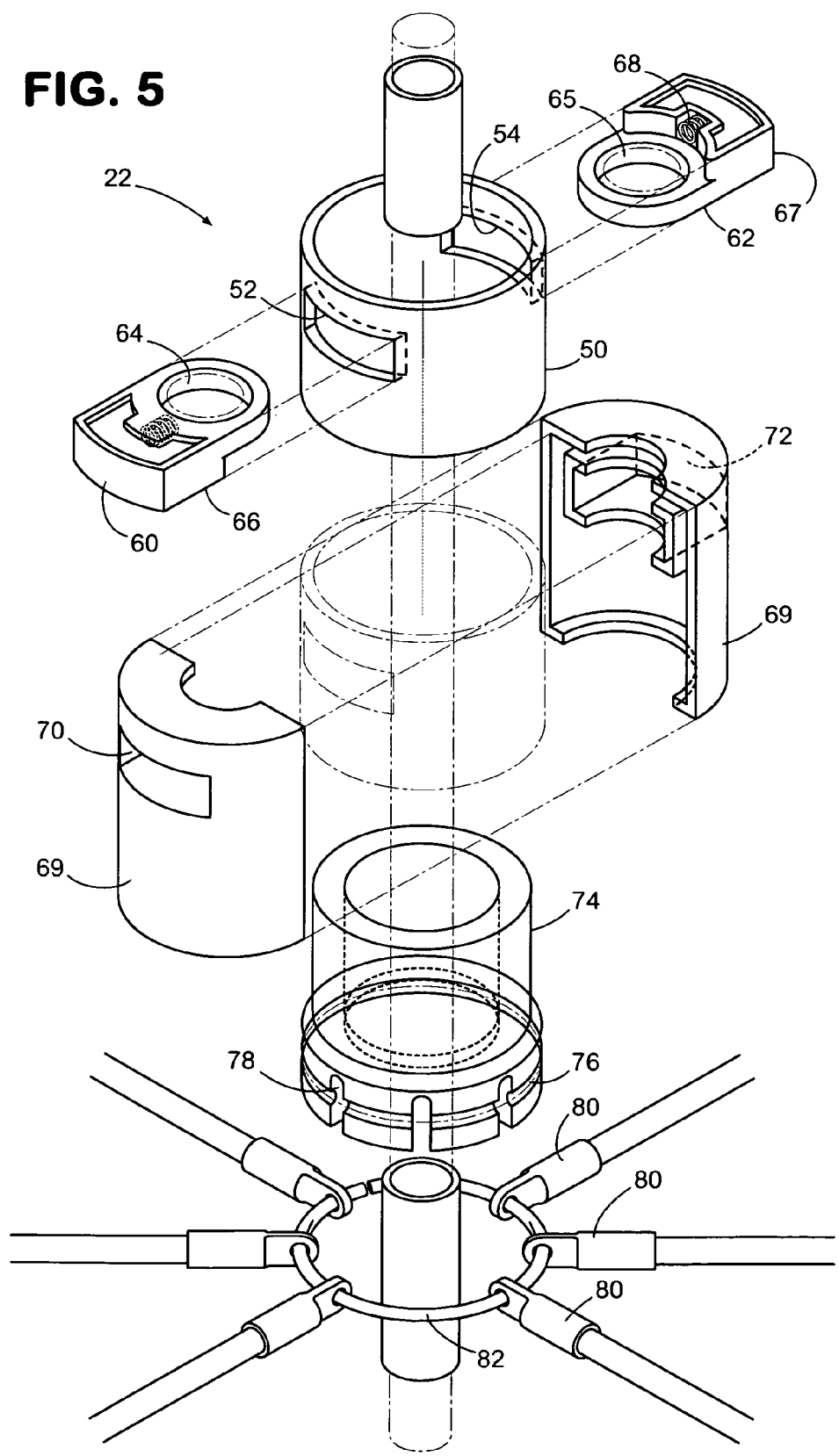
FIG. 5 is an exploded view of the release assembly of the enclosure of the present invention.

The construction of release assembly 22 is illustrated in FIGS. 4A, 4B and 5. As shown in FIG. 5, release assembly 22 includes a shaft mount 50 which preferably includes a cylindrical body having a first release catch aperture 52 disposed on a first side of the cylindrical body and a second release catch aperture 54 disposed on a second side of the cylindrical body. Preferably the first and second release catch apertures are oppositely disposed. A first release catch 60 is received within first release catch aperture 52 and a second release catch 62 is received within second release catch aperture 54. Both release catches are similarly designed having a central body defining a central shaft receiving channel 64 and 65 which are preferably circular in profile. The central body also includes a stepped rear portion 66 and 67 which carries a spring 68. Spring 68 biases both first and second release catches 60 and 62 such that the central shaft receiving channels of each catch, 64 and 65, are off centered resulting in the overall diameter of the defined shaft opening of both catches being less than the diameter of the lower stop 30. The overlapping relationship of the central shaft receiving channels is illustrated in FIG. 4A. In this normal position the springs biases the release assembly construction prevents the release assembly from extending over the lower stop 30 when the shell is deployed as shown in FIG. 3C. This enables the deployed shell to traverse the length of mount 10 without fear that the shell will collapse from its deployed position.

Release assembly 22 also includes a catch collar 69 for enclosing the assembly of the shaft mount 50 and the respective release catches and springs. The catch collar 69 preferably includes a cylindrical body which includes oppositely disposed catch collar apertures 70 and 72 which are aligned with the first and second release catch apertures disposed in the shaft mount. In this manner, the first and second release catches are stabilized and accessible for manual manipulation.

Release assembly 22 also includes a spoke hub 74 which carries the first ends of the cover support arms 18. The various first ends of the cover support arms include a spoke journal 80. The various spoke journals are mounted on a spoke ring 82. Spoke hub 74 includes a spoke ring mount 76 which includes a plurality of spoke journal mounting slots 78 for receiving the spoke ring 82 and spoke journals 80. Consequently, movement of the respective cover support arms is controlled by the operation of the release catches and their interaction with the lower stop.

FIGS. 3D and 4B illustrate the collapsing of the shell 12 once it has been deployed into a general hemispherical configuration as shown in FIGS. 3A-3C. In order for shell 12 to collapse, the second plurality of support arms 24 must be manipulated to pass back over center becoming unlocked while pivoting at pivot mount 46 thereby releasing support of the bowed cover support arms resulting in the tension previously stored within the cover forcing the cover support arms to collapse into a linear position as the cover support arms rotate around spoke ring 82.

In one embodiment, the manipulation of the second plurality of support arms is achieved by utilizing intermediary spacer 44 in conjunction with lower stop 30. Intermediary spacer 44 is free floating along the length of shaft 11 and preferably has a length such that a first end abuts spoke hub 26 while a second end abuts the a release catch of the release assembly 22 when the shell is in the deployed hemispherical position as shown in FIG. 3C. In the deployed position, shell 12 operates as a single unit and moves as one piece along shaft 11 when deployed. Such movement is limited by the release assembly 22 engaging the lower stop 30. When the respective release catches 60 and 62 are manipulated to overcome the bias of spring 68, the respective central shaft receiving channels 64 and 65 overlap concentrically defining lower stop receiving channel 80. By defining lower stop receiving channel 80, release assembly 22 is enabled to pass over lower stop 30. While passing over lower stop 30, intermediary spacer 44 engages lower stop 30 limiting further downward movement of intermediary spacer 44. As release assembly further travels downward simultaneously pulling spoke hub 26 downward abutting intermediary spacer 44, intermediary spacer 44 prevents spoke hub 26 further traveling down shaft 11 resulting in the second plurality of support arms 24 being articulated at pivot mount 46 and becoming unlocked by moving past center. With the unlocking of the second plurality of support arms 2, the tension of the cover manipulates the cover support arms to pivot at spoke ring 82 into a linear collapsed position as shown in FIG. 2.

Thus it can be seen that an advantageous construction for a protective enclosure can be had according to the invention. The protective enclosure includes a shell unit having a cover which can slide over a mount in a deployed hemispherical configuration for positioning of the cover over an object. The shell unit can be collapsed for storage. While one preferred embodiment of the mechanism of the invention is shown, other alternative embodiments may exist.

We claim:

1. A collapsible enclosure comprising:
   a mount having a central shaft;
   a shell carried by said central shaft;
   said shell having a first plurality of support arms carrying a cover and a second plurality of support arms pivotally connected with said first plurality of support arms for articulating said first plurality of support arms from a first generally linear position to a second generally bowed position for presenting said cover into a generally hemispherical configuration;
   said first and second plurality of support arms carried by said central shaft in a manner enabling said shell to traverse said central shaft when said cover is in said generally hemispherical configuration; and a lower stop of a predetermined width carried by said mount for abutting said release assembly limiting the traversing of said release assembly, said release assembly including a first and second release catch each having a respective body defining a lower stop receiving channel, said lower stop receiving channel of each respective catch overlapping each other to define a diameter less than said predetermined width of said lower stop preventing said release assembly from traversing over said lower stop.

2. The collapsible enclosure of claim 1 further including a release assembly slidably carried by said mount, said release assembly carrying a first end of said first plurality of support arms enabling said first plurality of support arms to traverse said mount.

3. The collapsible enclosure of claim 2 further including a spoke hub for receiving a respective of a first end of said second plurality of support arms and where a distal end is pivotally carried by said first plurality of support arms, said spoke hub slidably carried by said mount enabling said second plurality of support arms to traverse said mount.

4. The collapsible enclosure of claim 3 wherein said release assembly and said spoke hub are offset an initial predetermined distance when said shell is in said first generally linear position and said release assembly and said spoke hub being closer together than said initial predetermined distance when said shell is in said generally bowed position.

5. The collapsible enclosure of claim 1 wherein each of said first and second release catch is biased in a position wherein said lower stop receiving channel has a diameter less than the diameter of said lower stop and also having an unbiased position wherein said lower stop receiving channel is larger than said diameter of said lower stop enabling said release assembly to pass over said lower stop, said shell capable of collapsing when said release assembly passes over said lower stop.

6. The collapsible enclosure of claim 1 wherein said shaft includes an augered end for securing said enclosure to the ground.

7. A plant protector comprising:
   a mount having a central shaft;
   a shell carried by said central shaft;
   said shell having a first plurality of support arms carrying a cover and a second plurality of support arms pivotally connected with said first plurality of support arms for articulating said first plurality of support arms from a first generally linear position to a second generally bowed position for presenting said cover into a deployed configuration;
   said first and second plurality of support arms carried by said central shaft in a manner enabling said shell to traverse said central shaft when said cover is in said deployed configuration;
   a release assembly slidably carried by said mount, said release assembly carrying a first end of said first plurality of support arms enabling said first plurality of support arms to traverse said mount;
   a spoke hub for receiving a respective of a first end of said second plurality of support arms and where a distal end is pivotally carried by said first plurality of support arms, said spoke hub slidably carried by said mount enabling said second plurality of support arms to traverse said mount;
   wherein said release assembly and said spoke hub are offset an initial predetermined distance when said shell is in said first generally linear position and said release assembly and said spoke hub being closer together than said initial predetermined distance when said shell is in said deployed configuration;
   a lower stop of a predetermined width carried by said mount for abutting said release assembly limiting the traversing of said release assembly, said release assembly including a first and second release catch each having a respective body defining a lower stop receiving channel, said lower stop receiving channel of each respective catch overlapping each other to define a diameter less than said predetermined width of said lower stop preventing said release assembly from traversing over said lower stop; and
   each of said first and second release catch is biased in a position wherein said lower stop receiving channel has a diameter less than the diameter of said lower stop and also having an unbiased position wherein said lower stop receiving channel is larger than said diameter of said lower stop enabling said release assembly to pass over said lower stop, said shell capable of collapsing when said release assembly passes over said lower stop.

8. The collapsible enclosure of claim 7 wherein said shaft includes an augered end for securing said enclosure to the ground.

* * * * *